(12) United States Patent
Soeda et al.

(10) Patent No.: US 7,387,186 B2
(45) Date of Patent: Jun. 17, 2008

(54) POWER STEERING APPARATUS

(75) Inventors: Jun Soeda, Kanagawa (JP); Tadaharu Yokota, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 437 days.

(21) Appl. No.: 11/246,310

(22) Filed: Oct. 11, 2005

(65) Prior Publication Data
US 2006/0081411 A1 Apr. 20, 2006

(30) Foreign Application Priority Data
Oct. 15, 2004 (JP) ............................. 2004-301081

(51) Int. Cl.
*B62D 5/06* (2006.01)
(52) U.S. Cl. ...................... 180/422; 251/129.2; 180/441
(58) Field of Classification Search ................. 180/422, 180/441, 442; 251/129.02, 129.15, 129.2; 137/315.03; 91/521
See application file for complete search history.

(56) References Cited

U.S. PATENT DOCUMENTS

| | | | | |
|---|---|---|---|---|
| 4,662,466 A * | 5/1987 | Eto et al. | ..................... | 180/422 |
| 6,568,499 B2 * | 5/2003 | Nakazawa et al. | .......... | 180/422 |
| 6,880,668 B2 * | 4/2005 | Sakaki et al. | ................ | 180/441 |
| 6,886,657 B2 * | 5/2005 | Yokota et al. | ................ | 180/422 |
| 7,044,262 B2 * | 5/2006 | Otaki et al. | .................. | 180/422 |

FOREIGN PATENT DOCUMENTS

JP 2002-145087 A 5/2002

* cited by examiner

*Primary Examiner*—Tony H Winner
(74) *Attorney, Agent, or Firm*—Foley & Lardner LLP

(57) ABSTRACT

A power steering apparatus includes a hydraulic power cylinder, a reversible pump including a first outlet connected with a first pressure chamber of the power cylinder through a first fluid passage, and a second outlet connected with a second pressure chamber of the power cylinder through a second fluid passage, and a motor for driving the pump. A controller controls the motor in accordance with a sensed steering force. There is further provided a connection passage connecting the first and second fluid passages together, and a closing valve disposed in the connection passage. The controller sends a first current to a coil of the valve to close the connection passage by moving an armature, to send a second current lower than the first current to the coil after the connection passage is closed, and to deenergize the coil to open the connection passage.

20 Claims, 5 Drawing Sheets

POWER STEERING APPARATUS

BACKGROUND OF THE INVENTION

The present invention relates to a power steering system or apparatus, and/or a power steering control method, and more specifically to a motor-driven hydraulic power steering system.

A power steering system is arranged to produce a power assisting force (steering assist force) with a hydraulic power cylinder by a flow control valve in accordance with an operation of a steering wheel. A Published Japanese Patent Application Publication No. 2002-145087 shows a power steering system including an opening/closing solenoid valve disposed in a connection passage or bypass passage connecting left and right circuit sections. This solenoid valve is a normally open valve which allows a normal power steering operation by closing the connection passage when energized, and which opens the connection passage to enable a manual steering operation when the solenoid valve is not energized.

SUMMARY OF THE INVENTION

However, the normally open type solenoid valve requires the supply of current always to keep the passage closed. Therefore, the normally open type valve tends to increase the consumption of electric power, and to increase the amount of heat generated by the solenoid valve. Moreover, limitations are imposed on the type and shape of wires in the design, and therefore the manufacturing cost is increased.

It is therefore an object of the present invention to provide power steering system and/or method advantageous in power consumption.

According to one aspect of the invention, a power steering apparatus comprises: a power steering apparatus comprises: a hydraulic power cylinder including first and second pressure chambers and a piston separating the first and second pressure chambers to provide a steering force to a steering mechanism connected with a steering wheel; a reversible pump including first and second outlets to supply a hydraulic pressure selectively to the first chamber or the second pressure chamber; a first fluid passage connecting the first outlet of the reversible pump with the first pressure chamber of the power cylinder; a second fluid passage connecting the second outlet of the reversible pump with the second pressure chamber of the power cylinder; a motor arranged to drive the reversible pump in a forward rotational direction or a reverse rotational direction; a steering assist force sensor arranged to sense a steering assist force to be provided to the steering wheel; a motor control circuit configured to deliver a motor drive signal to the motor to cause the motor to produce the hydraulic pressure in accordance with the steering assist force; a connection passage connecting the first and second fluid passages together; a closing valve which is disposed in the connection passage and which includes, a valve element arranged to open and close the connection passage, an armature arranged to move the valve element to open and close the connection passage, a coil to drive the armature, and a magnetic member of a magnetic material arranged to attract the armature when the coil is energized; and a valve control circuit configured to send a first current to the coil to close the connection passage by moving the armature, to send a second current lower than the first current to the coil after the connection passage is closed, and to deenergize the coil to open the connection passage.

According to another aspect of the present invention, a power steering apparatus comprises: a hydraulic power cylinder including first and second pressure chambers and a piston separating the first and second pressure chambers to provide a steering force to a steering mechanism connected with a steering wheel; a reversible pump including first and second outlets to supply a hydraulic pressure selectively to the first pressure chamber or the second pressure chamber; a first fluid passage connecting the first outlet of the reversible pump with the first pressure chamber of the power cylinder; a second fluid passage connecting the second outlet of the reversible pump with the second pressure chamber of the power cylinder; a motor arranged to drive the reversible pump in a forward rotational direction or a reverse rotational direction; a steering assist force sensor arranged to sense a steering assist force to be provided to the steering wheel; a motor control circuit configured to deliver a motor drive signal to the motor to cause the motor to produce the hydraulic pressure in accordance with the steering assist force; a reservoir tank to store a hydraulic fluid; a first check valve disposed in a feed passage connecting the reservoir tank to the first fluid passage, and arranged to allow fluid flow only in a direction from the reservoir tank to the first fluid passage; a second check valve disposed in a passage connecting the reservoir tank to the second fluid passage, and arranged to allow fluid flow only in a direction from the reservoir tank to the second fluid passage; a first connection passage connecting the first fluid passages with the reservoir tank; a second connection passage connecting the second fluid passages with the reservoir tank; a closing valve which is disposed between the reservoir tank and the first and second connection passages and which includes, a valve element arranged to move between an open position to make a fluid connection between the reservoir tank and the first and second connection passages and a close position to break the fluid connection between the reservoir tank and the first and second connection passages, an armature arranged to move the valve element between the open and close positions, a coil to drive the armature, and a magnetic member of a magnetic material arranged to attract the armature when the coil is energized; and a valve control circuit configured to send a first current to the coil to move the valve element to the close position by moving the armature, to send a second current lower than the first current to the coil after the valve element is moved to the close position, and to deenergize the coil to move the valve element to the open position.

According to still another aspect of the present invention, a power steering apparatus comprises: a hydraulic power cylinder including first and second pressure chambers and a piston separating the first and second pressure chambers to provide a steering force to a steering mechanism connected with a steering wheel; a reversible pump including first and second outlets; means for defining a first fluid passage connecting the first outlet of the reversible pump with the first pressure chamber of the power cylinder; means for defining a second fluid passage connecting the second outlet of the reversible pump with the second pressure chamber of the power cylinder; a motor arranged to drive the reversible pump in a forward rotational direction or a reverse rotational direction; steering assist force sensing means for sensing a steering assist force to be provided to the steering wheel; motor control means for controlling the to produce the hydraulic pressure in accordance with the steering assist force; means for defining a connection passage connecting the first and second fluid passages together; a closing valve which is disposed in the connection passage and which includes, a valve element arranged to open and close the connection passage, an armature arranged to move the valve element to open and close the connection passage, a coil to drive the armature, and a magnetic member of a magnetic material arranged to attract the armature when the coil is energized; and valve control means for supplying a first current to the coil to close the connection passage by moving the armature, for supplying a second current lower than the first current to the coil after the connection passage is closed, and for deenergizing the coil to open the connection passage.

DETAILED DESCRIPTION OF THE INVENTION

Figure 2:
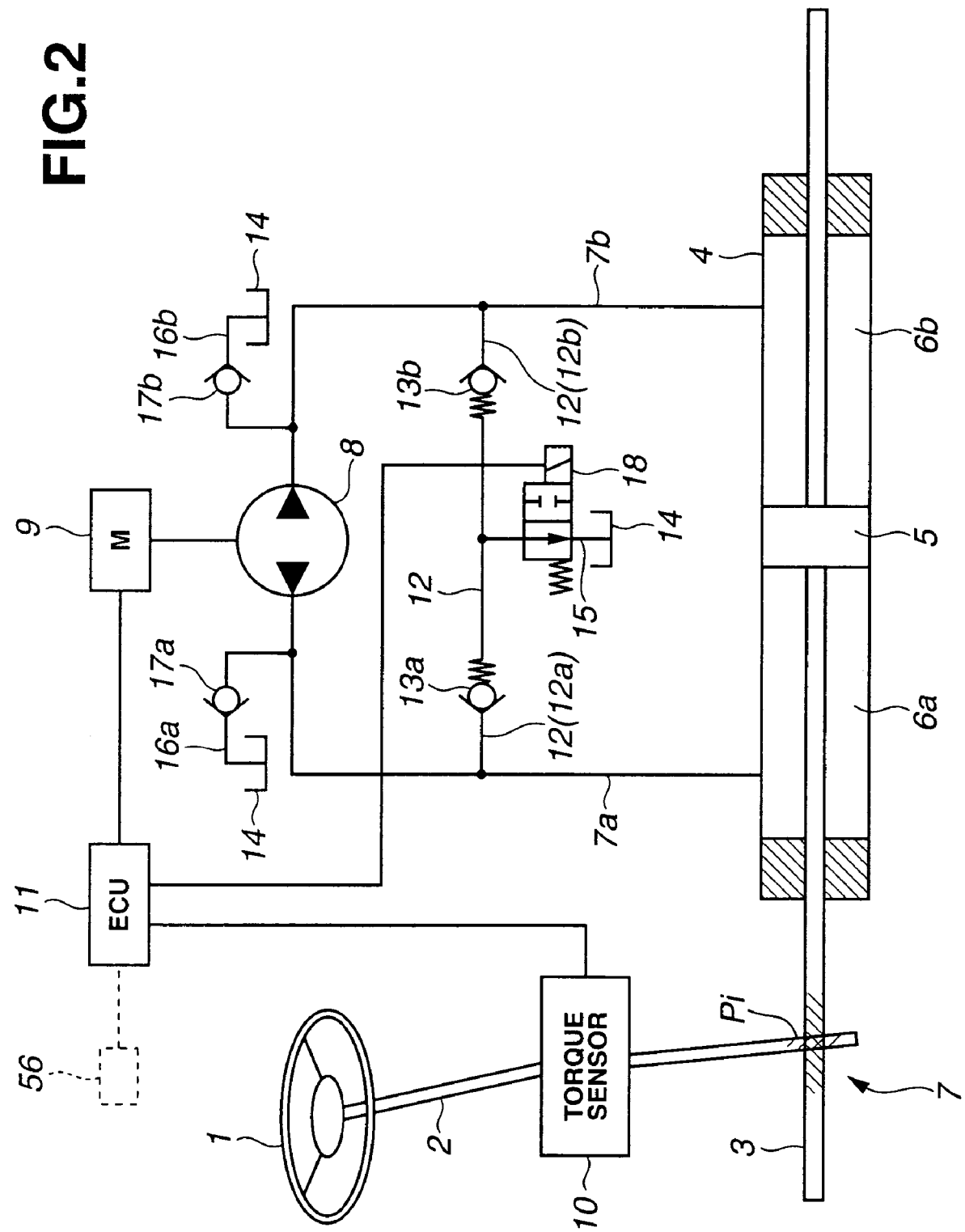
FIG. 2 is a schematic view showing the power steering system according to the embodiment of the present invention.

FIG. 2 shows a power steering apparatus according to one embodiment of the present invention. A steering wheel 1 is provided at an upper end of a steering shaft, and connected through steering shafts 2 with a steering mechanism. In this example, steering mechanism 7 is a steering gear mechanism of a rack and pinion type including a pinion gear Pi provided at the lower end of steering shaft 2, and a rack 3 extending in a lateral direction of a vehicle and engaging with the pinion gear Pi. Both end of rack 3 are connected with steerable wheels of the vehicle, respectively, through tie rods.

Rack 3 is incorporated in a hydraulic power cylinder 4 for providing an assisting steering force to steering wheel 1. In this example, power cylinder 4 includes a piston 5 disposed slidably inside power cylinder 4, and connected with rack 3 which passes through piston 5. Piston 5 separates first and second pressure chambers 6a and 6b. A reversible pump 8 includes a first outlet connected through a first fluid passage 7a with the first pressure chamber 6a of hydraulic power cylinder 6, and a second outlet connected through a second fluid passage 7b with the second pressure chamber 6b of hydraulic power cylinder 4. An electric motor 9 is connected with reversible pump 8 and arranged to drive reversible motor 8 in a forward rotational direction and a reverse rotational direction.

In the steering linkage including steering shaft 2, there is provided a steering torque sensor 10 (serving as steering torque sensing means) for sensing a steering torque to be provided to steering wheel 1 by power cylinder 4. An electronic control unit (ECU) 11 receives a steering torque signal from steering torque sensor 10, and produces a motor drive signal sent to motor 9 to produce a hydraulic pressure with power cylinder 4 in accordance with the sensed steering torque. Control unit 11 can serve as motor control means for controlling motor 9. A motor control section provided in control unit 11 is connected with motor 9.

A connection passage 12 is a fluid passage to connect first and second fluid passages 7a and 7b in order to disable the power steering system. A first check valve 13a is disposed in a first section (or first connection passage) 12a of connection passage 12 near the first fluid passage 7a, and a second check valve 13b is disposed in a second section (or second connection passage) 12b of connection passage 12 near the second fluid passage 7b. A solenoid valve (or closing valve) 18 for serving as an open/close valve may be provided at a middle of connection passage 12, and arranged to connect the first and second fluid passages 7a and 7b directly. In the example shown in FIG. 2, solenoid valve 18 is disposed in an indirect (or drain) connection passage 15 connecting a middle of connection passage 12 between first and second check valves 13a and 13b, with a reservoir tank 14 for storing a hydraulic fluid. There are further provided first and second feed connection passages 16a and 16b extending from the reservoir tank 14, respectively, to first and second fluid passages 7a and 7b. A third check valve 17a is disposed in first feed connection passage 16a, and a fourth check valve 17b is disposed in second feed connection passage 16b. When an abnormal condition occurs in the system, solenoid valve 18 is opened to connect the first and second fluid passages 7a and 7b together through reservoir tank 14 under the control of control unit 11 serving as valve controlling means. A solenoid valve control section provided in control unit 11 is connected with solenoid valve 18.

Figure 1:
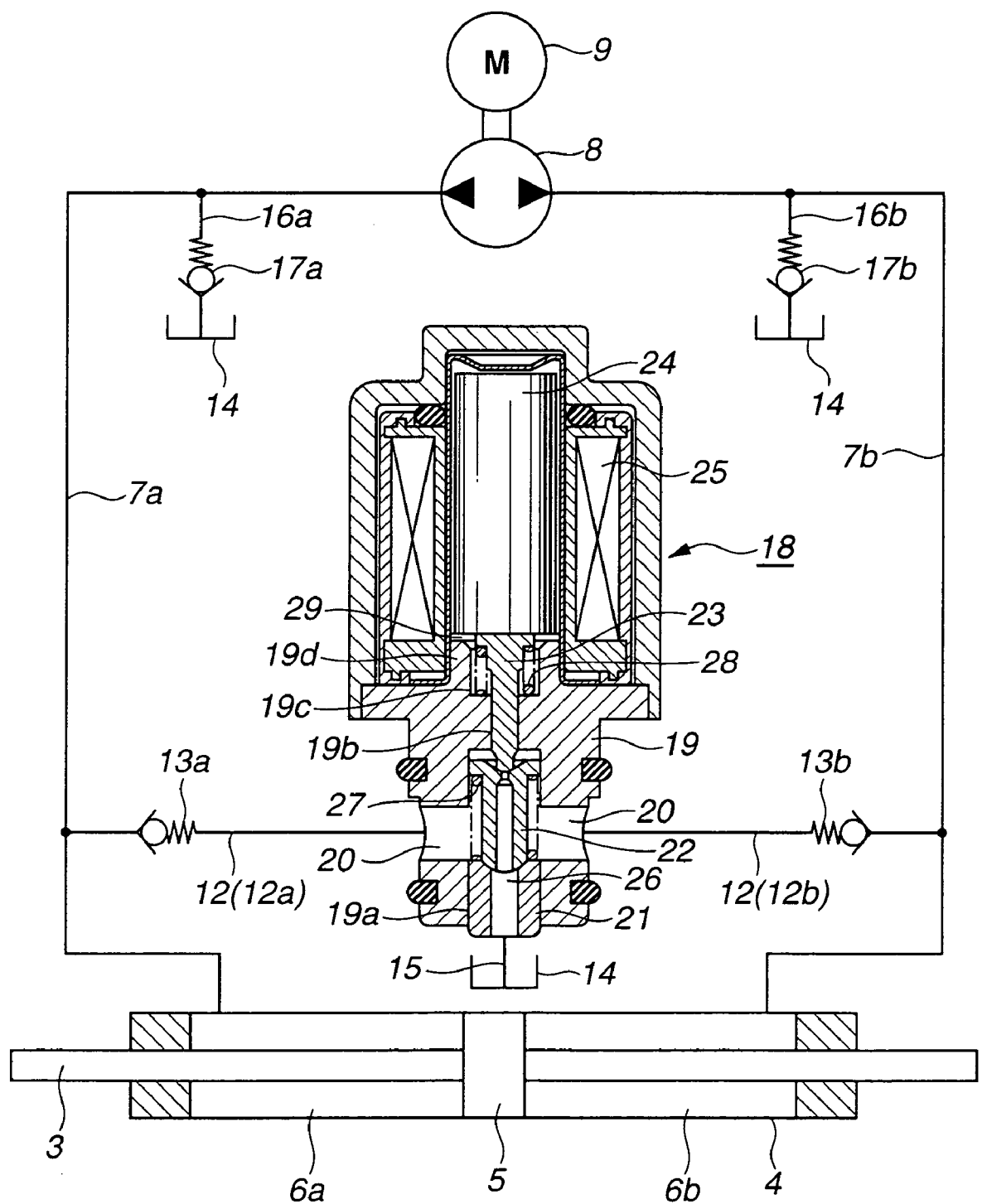
FIG. 1 is a view showing a solenoid valve, in section, employed in a power steering system according to one embodiment of the present invention.

FIG. 1 shows the construction of solenoid valve 18. Solenoid valve 18 includes a valve housing 19 which is a magnetic member of magnetic material. Valve housing 19 is approximately in the form of a hollow cylinder. Valve housing 19 is formed with an axially extending center through hole composed of a large diameter hole section 19a, a small diameter hole section 19b and a medium diameter hole section 19c which are continuously connected to form a single continuous through hole. Valve housing 19 is further formed with a radially extending connection hole 20 connecting the first section 12a of connection passage 12 and the second section 12b of connection passage 12. Connection hole 20 extending radially and crosses the large diameter hole section 19a orthogonally. A hollow cylindrical seat 21 is fit in large diameter hole section 19a of valve housing 19. Seat 21 is formed with an axially extending connection hole 26 whose lower end is connected through connection passage 15 with reservoir tank 14.

A poppet 22 serving as a valve element is axially slidable in large diameter hole section 19a. Poppet 22 can move axially between an open position connecting the axially extending connection hole 26 of seat 21 with the radially extending connection hole 20, and a close position closing the connection hole 26 of seat 21 and shutting off the connection between the radially extending connection hole 20 and the axially extending connection hole 26. The lower end of poppet 22 is approximately semispherical. In the close position, the lower end of poppet 22 abuts on the upper end of seat 21, and closes connection hole 26. An axially extending rod 23 is axially slidably received in small diameter hole section 19b and medium diameter hole section 19c of valve housing 19.

An armature 24 is arranged to move poppet 22 back and force axially through rod 23. A coil 25 is provided around armature 24, and arranged to drive armature 24. The abovementioned valve housing 19 is made of the magnetic material as mentioned before. Valve housing 19 includes a magnetic projecting tubular portion 19d projecting upward (as viewed in FIG. 1) toward the armature located above valve housing 19. In the state shown in FIG. 1, coil 25 surrounds armature 24 and the tubular portion 19d of magnetic valve housing 19 at least. Tubular portion 19d of valve housing 19 is surrounded by coil 25.

When current is supplied to coil 25, armature 24 moves poppet 22 downward through rod 23 and closes the passage between connection holes 20 and 26. Between armature 24 and valve housing 19, there are provided two springs serving as urging means for urging poppet 2 in an upward direction away from valve housing 19. A first spring 27 is disposed between seat 21 and poppet 22, and a second spring 28 is disposed between valve housing 19 and rod 23. When no current is supplied to coil 25, poppet 24 is moved upward to the open position by the resilient forces of first and second springs 27 and 28.

Control unit 11 is configured to send a first current to the coil to close the connection passage by moving the armature when armature 24 is located at an upper position P, to continue the supply of the first current to coil 25 for a predetermined time duration, and to supply a second current (the coil exciting current of a level B lower than level A) smaller than the first current when armature 24 is located at a lower position Q closest to valve housing 19 or closest to the upper end of tubular portion 19d of valve housing 19. When armature 24 is in the lower position Q, poppet 22 is pushed downward and seated on the seat 21 to close the passage between connection holes 20 and 26. When armature 24 is located at the lower position Q closest to valve housing 19 as shown in FIG. 1, there remains a gap or clearance 29, so that armature 24 is held out of contact with valve housing 19, even at this closest position.

In the example shown in FIG. 2, control unit 11 is connected with a current sensor 56 which can serve as solenoid valve malfunction or abnormality detecting means, for monitoring electric current flowing through motor 9 during a steering assist operation. When an abnormality occurs after the changeover from the first current of level A to the second current of the lower level B, and solenoid valve 18 becomes unable to close the connection passage because of the abnormality, then the hydraulic oil flows between the first and second fluid passages 7a and 7b, and consequently motor 9 is driven at a higher speed to compensate for the deficiency of the oil supply due to the leakage between first and second fluid passages 7a and 7b. As a result, high current is supplied to motor 9 and the sensed actual current becomes greater than a command current. Therefore, current sensor 56 can detect a malfunction of solenoid valve 18 by monitoring the current flowing through motor 9. When an abnormality or malfunction is detected in the valve 18, control unit 11 supplies the first current of the higher level A.

The power steering system according to this embodiment is operated as follows: When an ignition switch of the vehicle is OFF or when solenoid valve 18 is not energized through the ignition switch is ON; poppet 22 and rod 23 are pushed upward as viewed in FIG. 1, by first and second springs 27 and 28, and the connection holes 20 and 26 are held open. Therefore, the hydraulic fluid returns from first pressure chamber 6a if in the state in which the fluid is supplied to first chamber 6a, through first check valve 13a, connection passage 12, connection holes 20 and 26, and connection passage 15, into reservoir tank 14. Then, from reservoir tank 14, the hydraulic fluid flows through check valve 17b and connection passage 16b, into second fluid passage 7b, and returns from second fluid passage 7b to reversible pump 8. Thus, when solenoid valve 8 is not energized, solenoid valve 18 is in the open state to connect the first and second fluid passages 7a and 7b and to allow free movement of piston 5. Therefore, this power steering system enables manual steering operations, and allows the driver to steer the vehicle manually.

Figure 3:
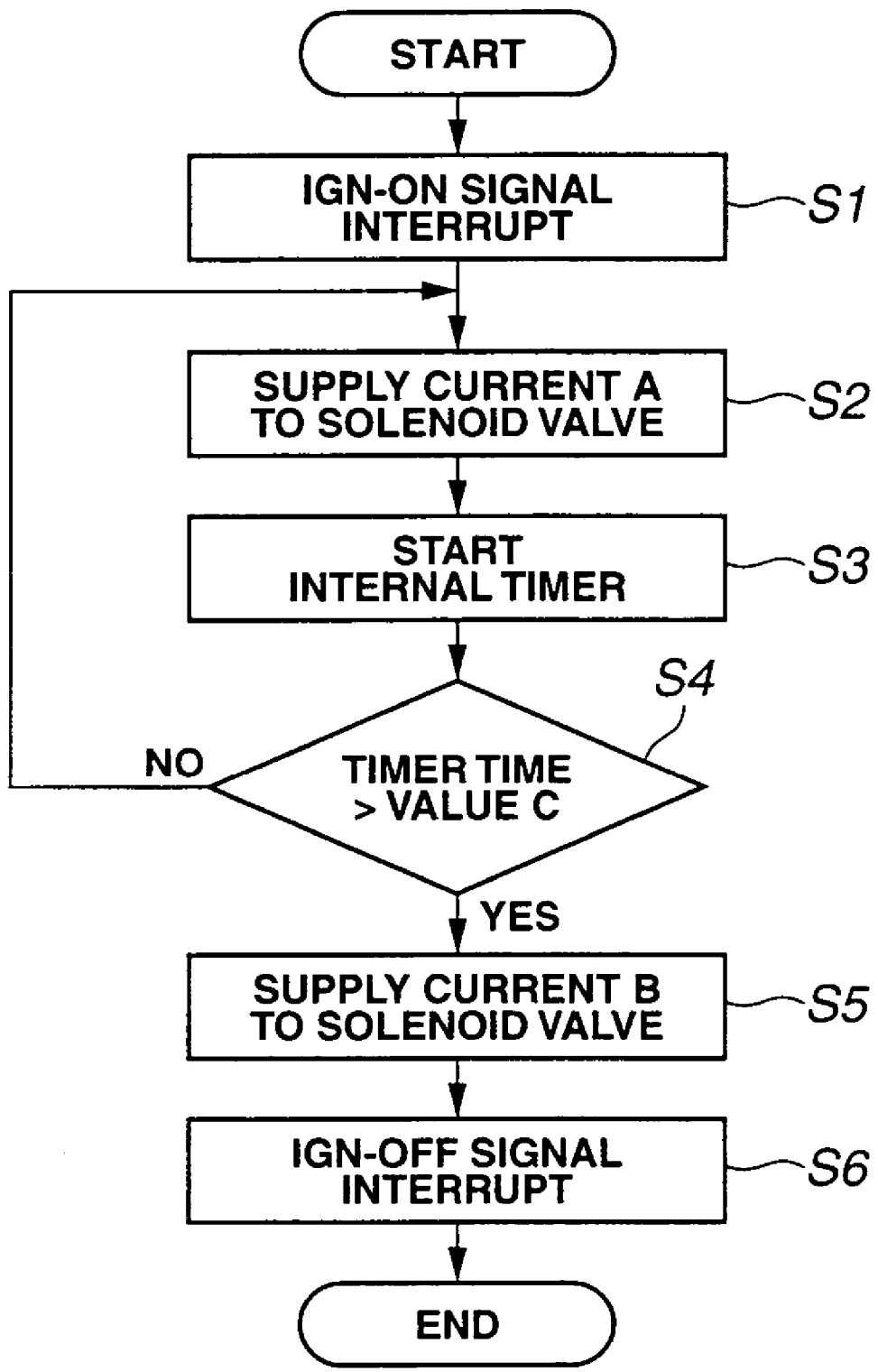
FIG. 3 is a flowchart showing operations of the power steering system of the embodiment.
Figure 4:
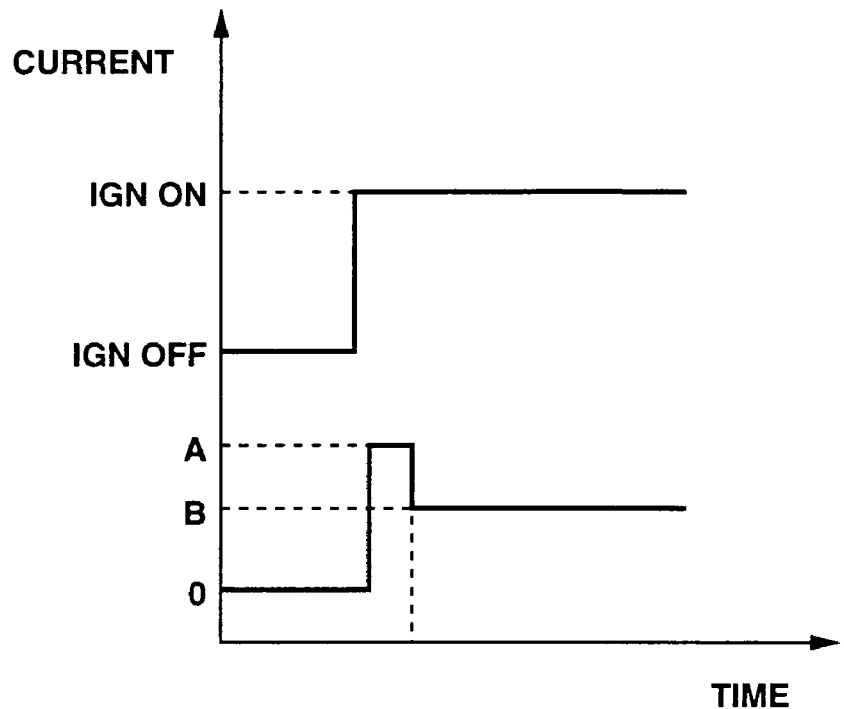
FIG. 4 is a graphic view showing the control of current in the power steering system according to the embodiment.

FIG. 3 illustrates a valve control process in a normal mode when an abnormal condition is not detected. When the ignition switch is turned on, an ignition on signal as shown in FIG. 4 is sent as an interrupt to control unit 11 at a step S1. In response to the ignition on signal, control unit 11 energizes the solenoid valve 18 by supplying a current of a higher level A as shown in FIG. 4.

Figure 5:
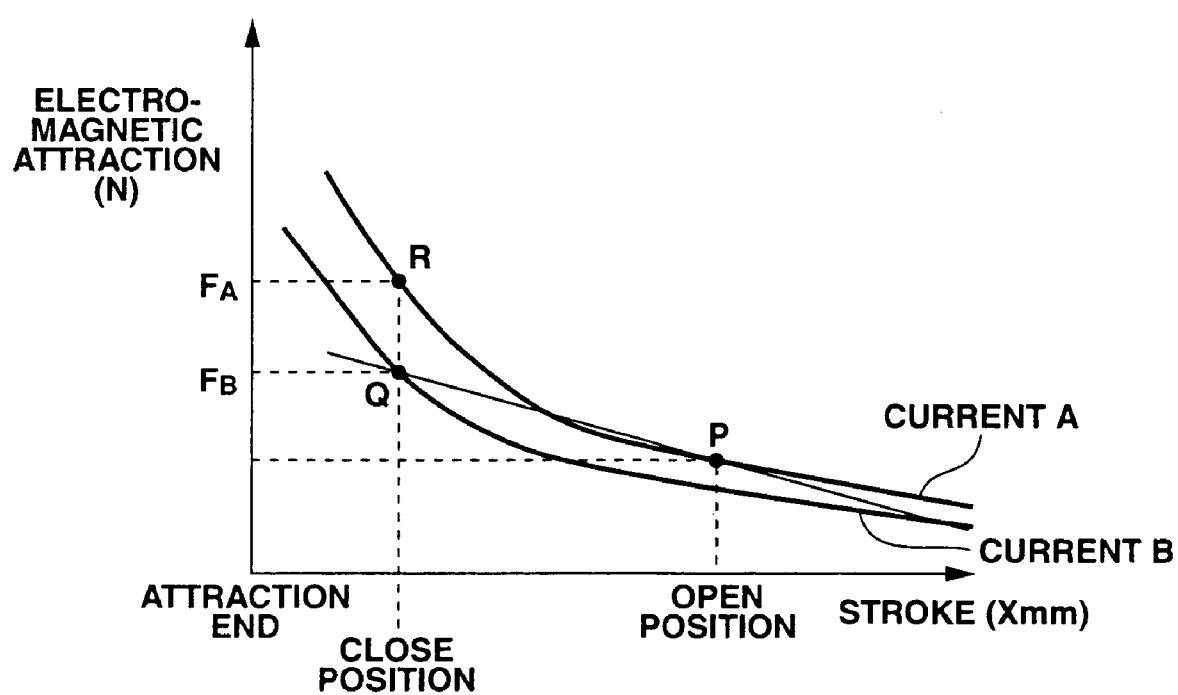
FIG. 5 is a graphic view showing a magnetic attractive force with respect to the stroke in the solenoid valve of shown in FIG. 1.

In solenoid valve 18, at the start of supply of current A, a thrust force $F_A$ of armature 24 is greater than a total resilient force FO of first and second springs 27 and 28 (FO<$F_A$). Therefore, as shown in FIG. 5, armature 24 moves from the upper position P at which armature 24 is spaced from valve housing 19, to the lower position Q close to valve housing 19. Therefore, poppet 22 and rod 23 are pushed downward against resilient forces of first and second springs 27 and 28, and poppet 22 closes the passage between connection holes 20 and 26. Thus, at the lower position Q, solenoid valve 18 is closed, and first and second fluid passages 7a and 7b are shut off from each other, so that the power steering system can function properly to provide steering assist force.

If armature 24 comes in contact with valve housing 19 of the magnetic material at the lower position Q, then armature 24 adheres to valve housing 19 because of residual magnetism, so that armature 24 becomes unable to return smoothly from the lower position Q toward the upper position P by the resilient forces of springs 27 and 28 when coil 25 is deenergized. In order to avoid this problem, there is formed the gap or clearance 29 between the upper end of tubular portion 19d of valve housing 19, and armature 24 at the lower position Q closest to the upper end of tubular portion 19d. Gap 29 prevents contact between armature 24 and valve housing 19. Therefore, armature 24 can move smoothly from the lower position Q toward the upper position P when coil 25 is deenergized. Thus, solenoid valve 18 can respond quickly to a deenergizing operation.

At a step S3, ECU 11 starts an internal timer for measuring a time interval from the start of the supply of the current A to solenoid valve 18. The internal timer is a timer within ECU 11. At a next step S4, ECU 11 compares the time measured by the timer with a predetermined time interval C corresponding to an amount of time required for closing solenoid valve 18. At the expiration of the time interval C from the start of the supply of current A, ECU 11 (the valve control section in ECU 11) decreases the current supplied to solenoid valve 18 from the current level A to the current level B lower than level A at a step S5. The predetermined time interval C can be determined experimentally by measuring the amount of time required to complete a valve closing operation. Thus, the power steering system according to this embodiment continues the supply of current A only during the valve operation to move poppet 24 from the open position to the close position, and thereafter decreases the current supplied to solenoid valve 18 to the current level B after solenoid valve 18 is brought to the close state, as shown in FIG. 4.

In the close state in which armature 24 is located at the lowermost position closest to tubular portion 19d of valve housing 19 of the magnetic material, and poppet 22 closes the passage between connection holes 20 and 26, the coil 25 producing magnetic field surrounds armature 24 and tubular portion 19d of magnetic valve housing 19. Therefore, the magnetic field is produced over both armature 24 and valve housing 19 of the magnetic material, and the force attracting armature 24 is increased. FIG. 5 shows the magnetic attractive force attracting armature 24 with respect to the position of armature 24 in the case of higher current A and lower current B. As shown in FIG. 5, the attractive force increases sharply as armature 24 moves downward and nears the valve housing 19. Therefore, solenoid valve 18 can produce an attractive force of a sufficient level with lower current B, and hold armature 24 in the lowermost position Q with lower current B. Thus, the power steering system can hold solenoid valve 18 in the close state only with the lower current B, and thereby reduce the electric power consumption. For example, current A is 1 A and current B is 0.6 A. In this case, the current is reduced by the amount of 0.4 A. Moreover, valve housing 19 is made of magnetic material. Therefore, the power steering system according to this embodiment requires no additional magnetic member separately, and simplifies the construction.

When armature 24 moves downward from the upper point P to the lower point Q, the rod 23 and poppet 22 are pushed downward by armature 24. Therefore, the first and second springs 27 and 28 are compressed, and the total force of springs 27 and 28 is increased from FO in the uncompressed state to F1 in the compressed state. Against this spring force, coil 25 produces a thrust force $F_B$ at point Q in the case of current B which is smaller than a thrust force $F_A$ in the case of current A at a point R in FIG. 5. However, the power steering system of this embodiment holds the thrust force $F_B$ greater than the spring force F1 (F1<$F_B$). Solenoid valve 18 is held in the closed state as long as thrust force FB is greater than spring force F1 (F1<$F_B$). Thus, the power steering system of this embodiment can reduce the consumption of electric power by the amount determined by the difference between current A and current B.

When the ignition switch is turned off, an ignition off signal is inputted as an interrupt to ECU 11 at a step S6. Upon receipt of the ignition off signal, ECU 11 shuts off the supply of current B to coil 25. Therefore, poppet 22 and rod 23 move upward together with armature 24 by the spring forces of first and second springs 27 and 28, and solenoid valve 18 is brought to the open state allowing manual steering operation.

In the case of an abnormal condition, coil 25 is deenergized, and therefore, armature 24 is moved in the upward direction away from valve housing 19, by the resilient force of first and second springs 27 and 28. Therefore, solenoid valve 18 opens the connection passage and enables the manual steering operation.

Figure 6:
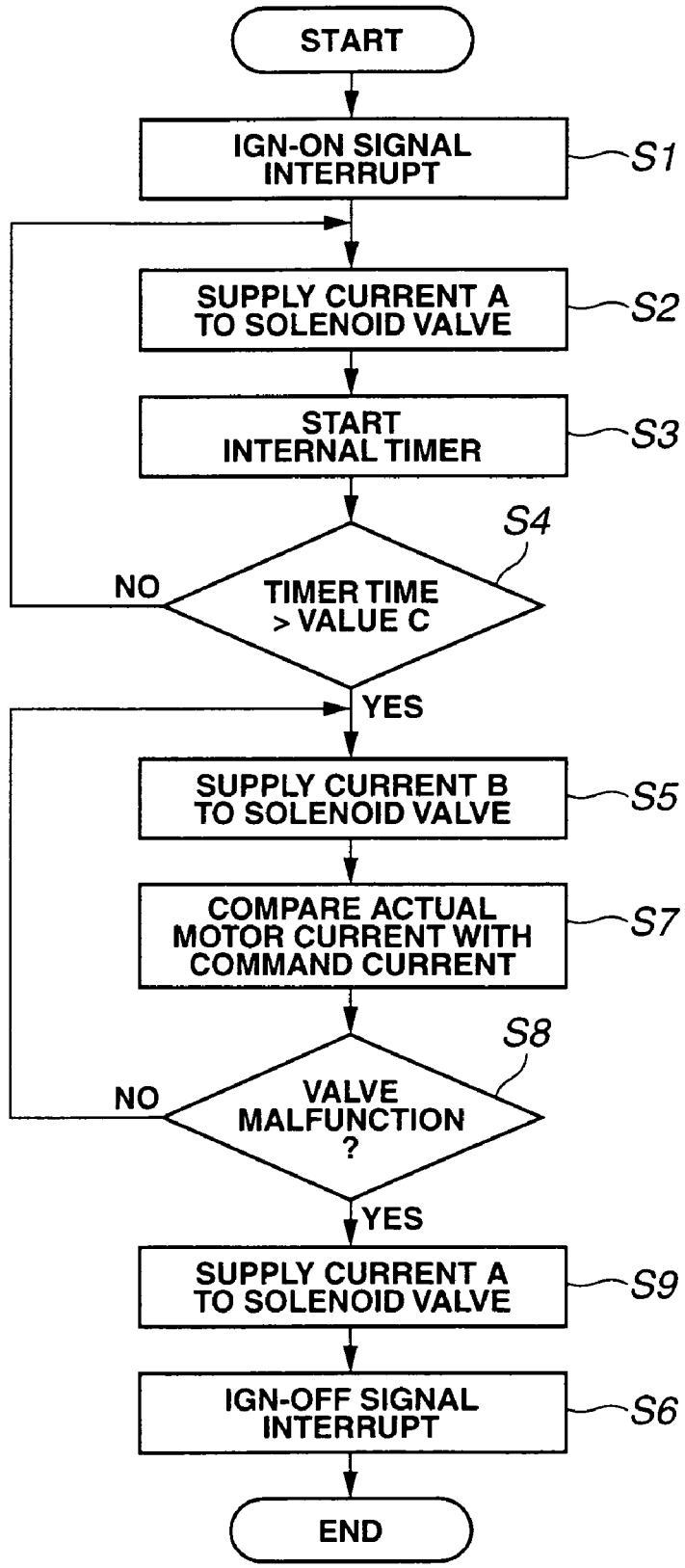
FIG. 6 is a flowchart showing operations of the power steering system of the embodiment when a malfunction occurs in the solenoid valve.

FIG. 6 shows a practical example of this embodiment in which the power steering system can function properly even if a malfunction occurs in solenoid valve 18.

Steps S1~S5 shown in FIG. 6 are substantially identical to steps S1~S5 of FIG. 3. Repetitive explanation is omitted on these steps.

If solenoid valve 18 opens during the supply of current B, solenoid valve 18 may become unable to return to the closed position because the current B supplied to coil 25 is low. Therefore, in the practical example shown in FIG. 6, the power steering system is arranged to detect a valve closure malfunction of solenoid valve 18, and to supply the greater current A again to coil 25 to close solenoid valve 18 securely. When spring force F1 becomes greater than thrust force $F_B$ after the decrease of the supply current to level, the poppet 22 moves slightly upwards and therefore, the fluid leaks through connection holes 20 and 26 between first and second fluid passages 7a and 7b. To compensate for this leakage between first and second fluid passages 7a and 7b, the speed of motor 9 is increased, and the current flowing through motor 9 is increased. Therefore, the above-mention current sensor 56 can detect a malfunction in solenoid valve 18 by monitoring the current flowing through motor 9.

At a step S7 following S5, ECU 11 ascertains the actual motor current through motor 9 sensed by current sensor 56. Then, the power steering system judges that there is a malfunction or abnormal condition in closing solenoid valve 18 when the sensed actual motor current is greater than a predetermined threshold value D. Alternatively, ECU 11 compares the sensed actual motor current with the command current at S7, and detects the malfunction when the sensed actual motor current is greater than the command current by an amount greater than or equal to a predetermined value. When the malfunction is detected (the answer of S8 is YES), the power steering system increases the thrust force by increasing the current supplied to motor 9 to the higher level A at a step S9, to close solenoid valve 18. Therefore, the thrust force is increased to $F_A$ which is greater than F1, by the supply of current A, and poppet 22 is pushed downward to the close position reliably. In this case, in order to hold solenoid valve 18 in the closed position securely, the power steering system continues the supply of higher current A until the ignition off signal is received at S6 following S9.

It is possible to detect a malfunction of solenoid valve 18 in various other ways. For example, it is possible to detect a solenoid valve malfunction by monitoring continuation of the drive state of motor 9 and the steering torque sensed by torque sensor 10. In this case, the system judges that there is a malfunction when the drive state of motor 9 continues for a duration longer than or equal to a predetermined amount of time, and at the same time the steering torque sensed by torque sensor 10 is greater than or equal to a predetermined level. When motor 9 is driven continuously for a long time, the sensed steering torque remains low normally because of the generation of a steering assist force. If, however, solenoid valve 18 is unable to close the connection passage sufficiently, the power steering system is unable to produce a sufficient steering assist force, and the sensed steering torque becomes greater than or equal to the predetermined level despite the continuation of the motor driving operation. Therefore, when the sensed steering torque is greater than or equal to the predetermined level in spite of the continuation of the motor drive operation, the system can judge that solenoid valve 18 is in an abnormal state. If a solenoid valve closing malfunction is detected in this way, the power steering system increases the current supplied to motor 9 from level B to level A as in the operation of S9, and thereby restore the system to the normal state capable of producing the steering assist force properly.

In the example shown in FIG. 1, it is optional to provide a magnetic member separate from the valve housing 19. Moreover, it is optional to connect the first and second fluid passages 7a and 7b together only through the connection passage 12, instead of using the reservoir tank 14 as a component through which the first and second fluid passages 7a and 7b are connected.

This application is based on a prior Japanese Patent Application No. 2004-301081 filed on Oct. 15, 2004. The entire contents of this Japanese Patent Application No. 2004-301081 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A power steering apparatus comprising:
   a hydraulic power cylinder including first and second pressure chambers and a piston separating the first and second pressure chambers to provide a steering force to a steering mechanism connected with a steering wheel;
   a reversible pump including first and second outlets to supply a hydraulic pressure selectively to the first pressure chamber or the second pressure chamber;

a first fluid passage connecting the first outlet of the reversible pump with the first pressure chamber of the power cylinder;

a second fluid passage connecting the second outlet of the reversible pump with the second pressure chamber of the power cylinder;

a motor arranged to drive the reversible pump in a forward rotational direction or a reverse rotational direction;

a steering assist force sensor arranged to sense a steering assist force to be provided to the steering wheel;

a motor control circuit configured to deliver a motor drive signal to the motor to cause the motor to produce the hydraulic pressure in accordance with the steering assist force;

a connection passage connecting the first and second fluid passages together;

a closing valve which is disposed in the connection passage and which includes,
   a valve element arranged to open and close the connection passage,
   an armature arranged to move the valve element to open and close the connection passage,
   a coil to drive the armature, and
   a magnetic member of a magnetic material arranged to attract the armature when the coil is energized; and a valve control circuit configured to send a first current to the coil to close the connection passage by moving the armature, to send a second current lower than the first current to the coil after the connection passage is closed, and to deenergize the coil to open the connection passage.

2. The power steering apparatus as claimed in claim 1, wherein the magnetic member includes a magnetic portion located at a position which the armature approach, to close the connection passage.

3. The power steering apparatus as claimed in claim 2, wherein the magnetic member of the closing valve is a valve housing formed with a through hole in which the valve element is movable.

4. The power steering apparatus as claimed in claim 3, wherein the magnetic portion of the magnetic member is surrounded by the coil.

5. The power steering apparatus as claimed in claim 3, wherein the closing valve further includes a resilient member disposed between the valve housing and the armature and arranged to urge the armature away from the valve housing.

6. The power steering apparatus as claimed in claim 1, wherein the magnetic member of the closing valve is spaced from the armature at a closest position closest to the magnetic member, by a gap preventing contact between the armature and the magnetic member.

7. The power steering apparatus as claimed in claim 6, wherein the valve control circuit is configured to continue supply of the first current to the coil for a predetermined time duration from a start of energization, and to supply the second current to the coil after the end of the predetermined time duration.

8. The power steering apparatus as claimed in claim 6, wherein the power steering apparatus further comprises an abnormality detecting section to detect an abnormal condition of the closing valve, and the valve control circuit is configured to supply the first current to the coil when the abnormal condition is detected.

9. The power steering apparatus as claimed in claim 1, wherein the abnormality detecting section judges that the closing valve is in the abnormal condition when the motor is in a drive state for a time longer than or equal to a predetermined time length and the steering assist force sensed by the steering assist force sensor is greater than or equal to a predetermined value.

10. The power steering apparatus as claimed in claim 1, wherein the power steering apparatus further comprises a first check valve disposed between the first fluid passage and the closing valve and arranged to allow fluid flow only in a direction from the first fluid passage to the closing valve, and a second check valve disposed between the second fluid passage and the closing valve and arranged to allow fluid flow only in a direction from the second fluid passage to the closing valve.

11. A power steering apparatus comprising:
   a hydraulic power cylinder including first and second pressure chambers and a piston separating the first and second pressure chambers to provide a steering force to a steering mechanism connected with a steering wheel;
   a reversible pump including first and second outlets to supply a hydraulic pressure selectively to the first pressure chamber or the second pressure chamber;
   a first fluid passage connecting the first outlet of the reversible pump with the first pressure chamber of the power cylinder;
   a second fluid passage connecting the second outlet of the reversible pump with the second pressure chamber of the power cylinder;
   a motor arranged to drive the reversible pump in a forward rotational direction or a reverse rotational direction;
   a steering assist force sensor arranged to sense a steering assist force to be provided to the steering wheel;
   a motor control circuit configured to deliver a motor drive signal to the motor to cause the motor to produce the hydraulic pressure in accordance with the steering assist force;
   a reservoir tank to store a hydraulic fluid;
   a first check valve disposed in a passage connecting the reservoir tank to the first fluid passage, and arranged to allow fluid flow only in a direction from the reservoir tank to the first fluid passage;
   a second check valve disposed in a passage connecting the reservoir tank to the second fluid passage, and arranged to allow fluid flow only in a direction from the reservoir tank to the second fluid passage;
   a first connection passage connecting the first fluid passages with the reservoir tank;
   a second connection passage connecting the second fluid passages with the reservoir tank;
   a closing valve which is disposed between the reservoir tank and the first and second connection passages and which includes,
      a valve element arranged to move between an open position to make a fluid connection between the reservoir tank and the first and second connection passages and a close position to break the fluid connection between the reservoir tank and the first and second connection passages,
      an armature arranged to move the valve element between the open and close positions,
      a coil to drive the armature, and
      a magnetic member of a magnetic material arranged to attract the armature when the coil is energized; and
   a valve control circuit configured to send a first current to the coil to move the valve element to the close position by moving the armature, to send a second current lower than the first current to the coil after the valve element is moved to the close position, and to deenergize the coil to move the valve element to the open position.

12. The power steering apparatus as claimed in claim 11, wherein the magnetic member of the closing valve is a valve housing formed with a through hole in which the valve element is movable.

13. The power steering apparatus as claimed in claim 11, wherein the valve control circuit is configured to continue supply of the first current to the coil for a predetermined time duration from a start of energization, and to supply the second current to the coil after the end of the predetermined time duration.

14. The power steering apparatus as claimed in claim 11, wherein the power steering apparatus further comprises an abnormality detecting section to detect an abnormal condition of the closing valve, and the valve control circuit is configured to supply the first current to the coil when the abnormal condition is detected.

15. The power steering apparatus as claimed in claim 11, wherein the power steering apparatus further comprises a third check valve disposed in the first connection passage and arranged to allow fluid flow only in a direction from the first fluid passage to the closing valve, and a fourth check valve disposed in the second connection passage and arranged to allow fluid flow only in a direction from the second fluid passage to the closing valve.

16. A power steering apparatus comprising:
a hydraulic power cylinder including first and second pressure chambers and a piston separating the first and second pressure chambers to provide a steering force to a steering mechanism connected with a steering wheel;
a reversible pump including first and second outlets;
means for defining a first fluid passage connecting the first outlet of the reversible pump with the first pressure chamber of the power cylinder;
means for defining a second fluid passage connecting the second outlet of the reversible pump with the second pressure chamber of the power cylinder;
a motor arranged to drive the reversible pump in a forward rotational direction or a reverse rotational direction;
steering assist force sensing means for sensing a steering assist force to be provided to the steering wheel;
motor control means for controlling the to produce the hydraulic pressure in accordance with the steering assist force;
means for defining a connection passage connecting the first and second fluid passages together;
a closing valve which is disposed in the connection passage and which includes,
a valve element arranged to open and close the connection passage,
an armature arranged to move the valve element to open and close the connection passage,
a coil to drive the armature, and
a magnetic member of a magnetic material arranged to attract the armature when the coil is energized; and
valve control means for supplying a first current to the coil to close the connection passage by moving the armature, for supplying a second current lower than the first current to the coil after the connection passage is closed, and for deenergizing the coil to open the connection passage.

17. The power steering apparatus as claimed in claim 16, wherein the magnetic member of the closing valve is a valve housing formed with a through hole in which the valve element is movable.

18. The power steering apparatus as claimed in claim 16, wherein the valve control means includes means for continuing supply of the first current to the coil for a predetermined time duration from a start of energization, and for supplying the second current to the coil after the end of the predetermined time duration.

19. The power steering apparatus as claimed in claim 16, wherein the power steering apparatus further comprises abnormality detecting means for detecting an abnormal condition of the closing valve, and the valve control means supplies the first current to the coil when the abnormal condition is detected.

20. The power steering apparatus as claimed in claim 16, wherein the power steering apparatus further comprises a first check valve disposed in the first connection passage and arranged to allow fluid flow only in a direction from the first fluid passage to the closing valve, and a second check valve disposed in the second connection passage and arranged to allow fluid flow only in a direction from the second fluid passage to the closing valve.

* * * * *